United States Patent
Mori et al.

(10) Patent No.: US 7,976,108 B2
(45) Date of Patent: Jul. 12, 2011

(54) VEHICLE BRAKE HYDRAULIC PRESSURE CONTROL SYSTEM

(75) Inventors: Ryoji Mori, Wako (JP); Atsushi Nakada, Wako (JP); Teppei Komori, Wako (JP); Susumu Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 643 days.

(21) Appl. No.: 12/132,190

(22) Filed: Jun. 3, 2008

(65) Prior Publication Data

US 2008/0296967 A1 Dec. 4, 2008

(30) Foreign Application Priority Data

Jun. 4, 2007 (JP) .................. 2007-148565

(51) Int. Cl.
*B60T 8/42* (2006.01)
(52) U.S. Cl. ...................... 303/11; 303/115.4
(58) Field of Classification Search .............. 303/10, 303/11, 113.4, 115.4, 115.5; 701/71, 80
See application file for complete search history.

(56) References Cited

U.S. PATENT DOCUMENTS

| 6,188,947 | B1 * | 2/2001 | Zhan ............................ 701/71 |
| 7,568,773 | B2 * | 8/2009 | Nomura et al. ........... 303/115.5 |
| 7,621,603 | B2 * | 11/2009 | Sato et al. .................. 303/11 |
| 7,798,576 | B2 * | 9/2010 | Sato et al. .................. 303/10 |
| 2008/0093919 | A1 * | 4/2008 | Klug et al. .................. 303/11 |
| 2008/0300763 | A1 * | 12/2008 | Mori et al. .................. 701/70 |

FOREIGN PATENT DOCUMENTS

| DE | 103 41 027 | 3/2004 |
| JP | 2004-196235 | 7/2004 |
| WO | 99/58380 | 11/1999 |
| WO | 2006/029979 | 3/2006 |

* cited by examiner

*Primary Examiner* — Christopher P Schwartz
(74) *Attorney, Agent, or Firm* — Rankin, Hill & Clark LLP

(57) ABSTRACT

A controller which controls an electric motor in such a manner that a rotational speed detected in a motor rotational speed detecting module 29 becomes a target rotational speed set in a target rotational speed setting module 37 controls, when a deviation between the rotational speed and the target rotational speed is large, a normally open solenoid valve in such a manner that a controlled variable of the normally open solenoid valve becomes smaller when the deviation is small.

9 Claims, 16 Drawing Sheets (CONT.)

(FIG.2 CONTINUED)
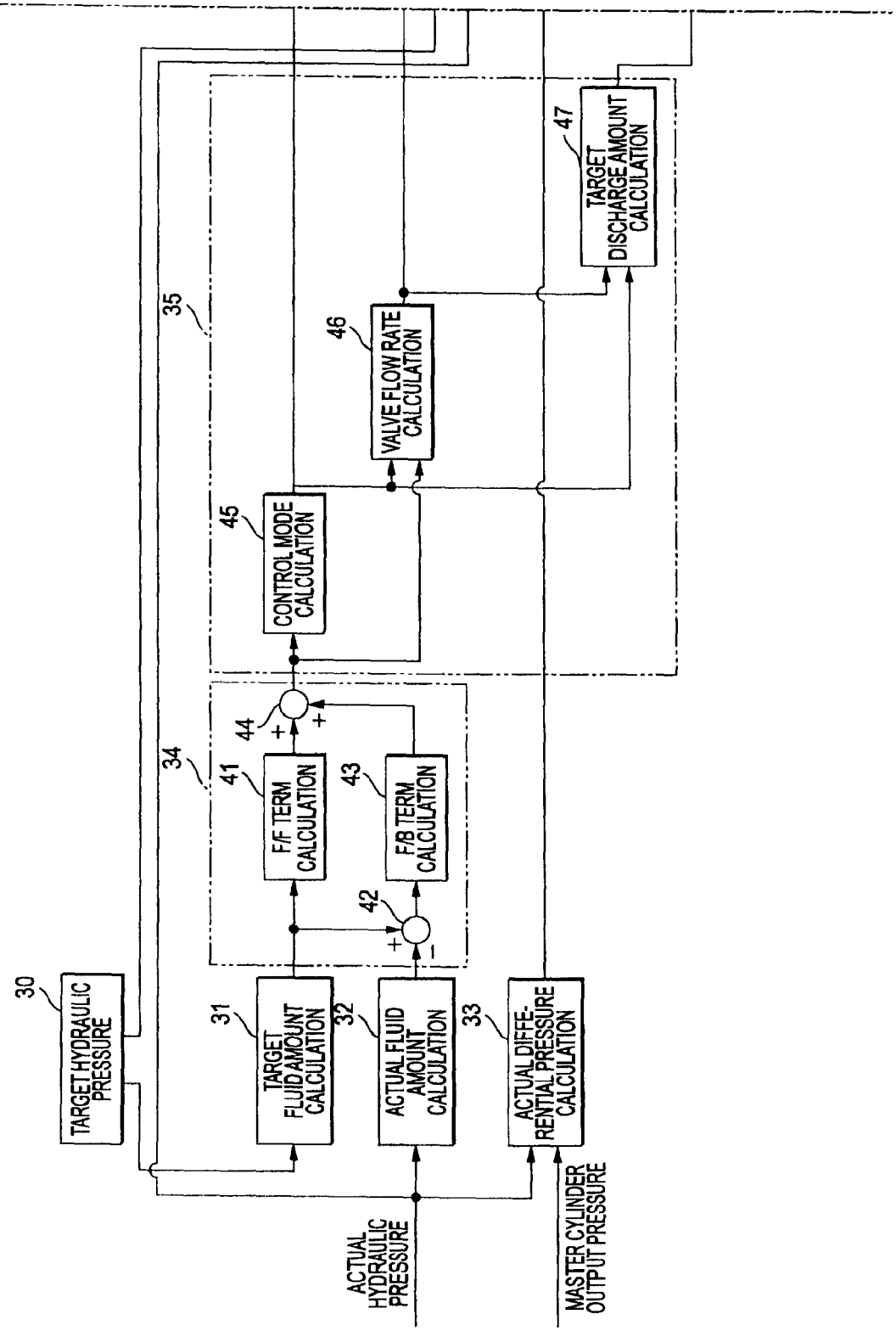

US 7,976,108 B2

VEHICLE BRAKE HYDRAULIC PRESSURE CONTROL SYSTEM

BACKGROUND OF THE INVENTION

1. Field of the Invention

The present invention relates to a vehicle brake hydraulic pressure control system including a hydraulic pressure generating source which outputs hydraulic pressure in response to operation of a brake pedal, wheel brakes which operate by the action of hydraulic pressure, a hydraulic pressure control unit which has a pump driven by an electric motor and a normally open solenoid valve interposed between a hydraulic pressure path to which a discharge side of the pump is connected and the hydraulic pressure generating source and which is interposed between the wheel brakes and the hydraulic pressure generating source in such a manner as to adjust hydraulic pressures at the wheel brakes, brake hydraulic pressure detecting unit which detects hydraulic pressures at the wheel brakes, and a controller which includes a target wheel brake pressure setting unit for setting target hydraulic pressures for the wheel brakes for controlling the operation of the hydraulic pressure control unit so that the hydraulic pressures at the wheel brakes become target hydraulic pressures set by the target wheel brake pressure setting unit.

2. Description of Related Art

A vehicle brake hydraulic pressure control system like this has already been known in, for example, Japanese Patent Unexamined Publication No. JP-A-2004-196235.

Incidentally, in a brake hydraulic pressure control system like this, hydraulic pressures built up in the wheel brakes can be controlled by adjusting the hydraulic pressure in the hydraulic pressure path which is connected to the discharge side of the pump by driving the pump by the electric motor and controlling the normally open solenoid valve, which is interposed between the hydraulic pressure path and the hydraulic pressure generating source, to open or close in such a state that no hydraulic pressure is outputted from the hydraulic pressure generating unit. As this occurs, although it is considered to increase the controlled variable of the normally open solenoid valve in order to enhance response and toughness with respect to disturbance, in the event that the controlled variable of the normally open solenoid valve is increased in such a state that the discharge pressure of the pump is not built up sufficiently at an initial stage of the control, an overshoot is generated when the discharge pressure of the pump has reached a predetermined value.

SUMMARY OF THE INVENTION

The invention has been made in view of the situations, and an object thereof is to provide a vehicle brake hydraulic pressure control system which can prevent the generation of overshoot while enhancing the response and toughness with respect to disturbance.

With a view to attaining the object, according to a first aspect of the invention, there is provided a vehicle brake hydraulic pressure control system including:

a hydraulic pressure generating source (M) which outputs hydraulic pressure in response to operation of a brake pedal;

wheel brakes (BA, BB) which operate by application of hydraulic pressure;

a pump (18) driven by an electric motor (17);

a motor rotational speed detecting unit (29) which detects a rotational speed of the electric motor (17);

a target rotational speed setting unit (37) which sets a target rotational speed for the electric motor (17);

a main hydraulic pressure path which communicates the hydraulic pressure generating source (M) with the pump (18);

a sub hydraulic pressure path (6) which communicates the main hydraulic pressure path with the wheel brakes (BA, BB);

a normally open solenoid valve (7) interposed between the sub hydraulic pressure path (6) and the hydraulic pressure generating source (M);

a brake hydraulic pressure detecting unit (23, 24) which detects hydraulic pressures at the wheel brakes (BA, BB);

a target wheel brake pressure setting unit (30) which sets target hydraulic pressures for the wheel brakes (BA, BB); and a controller (C) which controls the electric motor (17) so that the rotational speed detected by the motor rotational speed detecting unit (29) becomes the target rotational speed and also controls the normally open solenoid valve (7) so that the hydraulic pressures in the wheel brakes (BA, BB) become the target wheel brake hydraulic pressure, wherein the controller decreases a control amount of the normally open solenoid valve (7) as a deviation between the detected rotational speed and the target rotational speed increases.

According to a second aspect of the invention as set forth in the first aspect of the invention, it is adaptable that the vehicle brake hydraulic pressure control system further includes:

a switching valve unit (25) including:
  inlet valves (9, 10) disposed between the sub hydraulic pressure path (6) and the wheel brakes (BA, BB); and
  outlet valves (14, 15) disposed between the wheel brakes (BA, BB) and a reservoir (13), wherein the switching valve unit (25) switches following modes:
  a pressure build-up mode where the inlet valves (9, 10) are opened and the outlet valves (14, 15) are closed;
  a pressure reducing mode where the inlet valves (9, 10) are closed and the outlet valves (14, 15) are opened, and
  a pressure holding mode where the inlet and outlet valves (9, 10, 14, 15) are closed.

According to a third aspect of the invention as set forth in the second aspect of the invention, it is adaptable that the controller (C) further includes:

a target fluid amount calculating unit (31) which calculates target fluid amount based on the target hydraulic pressure set by the wheel brake hydraulic pressure setting unit (30);

an actual fluid amount calculating unit (32) which calculates an actual fluid amount based on the hydraulic pressure detected by the brake hydraulic pressure detecting unit (23, 24); and a target flow rate calculating section (34) which calculates a target flow rate for the wheel brakes (BA, BB) based the target fluid amount and the actual fluid amount.

According to a fourth aspect of the invention as set forth in the third aspect of the invention, it is adaptable that 4. The vehicle brake hydraulic pressure control system as set forth in claim 3, wherein the controller (C) switches the pressure build-up mode, the pressure reducing mode and the pressure holding mode based on signs and absolute values of the target flow rates calculated in the target flow rate calculating unit (34).

According to a fifth aspect of the invention as set forth in the first aspect of the invention, it is adaptable that the controller (C) controls currents applied to the normally open solenoid valve (7), the inlet valves (9, 10) and the outlet valves (14, 15) based on the target flow rate and a difference between the hydraulic pressures detected by the brake hydraulic pressure detecting unit (23, 24) and the target hydraulic pressures.

According to a sixth aspect of the invention as set forth in the first aspect of the invention, it is adaptable that the controller (C) further includes a target discharge amount calculating unit (47) which calculates a target discharge amount for the pump (18) based on the target flow rate, and the target rotational speed setting unit (37) sets the target rotational speed based on the target discharge amount.

According to a seventh aspect of the invention as set forth in the second aspect of the invention, it is adaptable that the controller (C) further includes:
  a pressure build-up timer (57) which implements a count value up normally except when the count value is cleared to "0" when the controller (C) controls to shift from the pressure build-up mode to the pressure reducing mode or to the pressure holding mode;
  a pressure reducing timer (58) which implements the count value up normally except when the count value is cleared to "0" when the controller (C) controls to shift from the pressure reducing mode to the pressure build-up mode or to the pressure holding mode; and
  a high select unit (59) which selects a high select value (TM_MDCAL) from the count values of the pressure build-up timer (57) and the pressure reducing timer (58),
  wherein the controller (C) increases a control variable of the normally open solenoid valve (7), the inlet valves (9, 10) or the outlet valves (14, 15) as the high select value (TM_MDCAL) increases.

According to an eighth aspect of the invention as set forth in the first aspect of the invention, it is adaptable that the controller (C) changes a gain (F/B) which controls the normally open solenoid valve (7) so as to decrease a control amount of the normally open solenoid valve (7) as the deviation between the detected rotational speed and the target rotational speed increases.

According to a ninth aspect of the invention as set forth in the first aspect of the invention, it is adaptable that a series circuit including a battery (60) and a switch (61) and a switch (62) for short-circuiting between both terminals of the electric motor (17) are connected to the both terminals of the electric motor (17) in parallel.

Note that a master cylinder M in an embodiment corresponds to the hydraulic pressure generating unit of the invention, a regulator valve 7 in the embodiment corresponds to the normally open solenoid valve of the invention, a target rotational speed operating module 37 in the embodiment corresponds to the target rotational speed setting unit of the invention, and a left front wheel disc brake BA and a right rear disc brake BB in the embodiment correspond to the wheel brakes of the invention.

According to the configuration that has been described above, the electric motor is controlled so that the rotational speed detected by the motor rotational speed detecting unit becomes the target rotational speed set in the target rotational speed setting unit and, when the deviation between the rotational speed detected in the motor rotational speed detecting unit and the rotational speed set in the target rotational speed setting unit is large, the normally open solenoid valve is controlled in such a manner that a controlled variable of the normally open solenoid valve becomes smaller than when the deviation is small. Therefore, the controlled variable of the normally open solenoid valve is made small when the pump starts discharging brake fluid so that the generation of overshoot can be prevented even when the discharge amount of the pump reaches a predetermined value at the initial stage of the control. Further, after the rotational speed deviation (the target rotational speed−the actual rotational speed) becomes small, the controlled variable of the normally open solenoid valve is made large so that the response and toughness with respect to disturbance can be enhanced.

DETAILED DESCRIPTION OF THE PREFERRED EMBODIMENTS

Hereinafter, a mode for carrying out the invention will be described based on an embodiment of the invention which are illustrated in the accompanying drawings.

FIGS. 1 to 15 show an embodiment of the invention.

Figure 1:
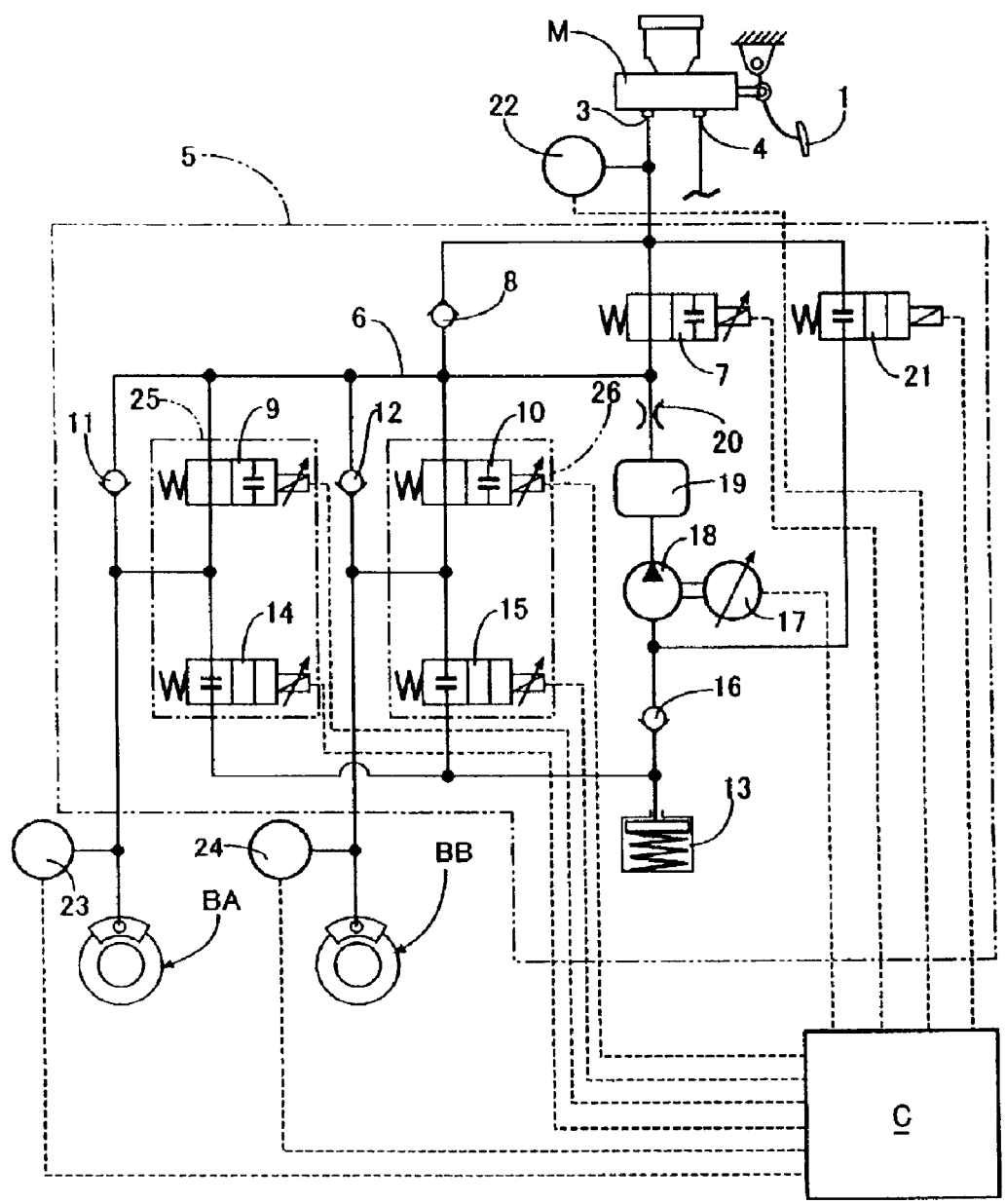
FIG. 1 is a hydraulic pressure system diagram showing the configuration of a vehicle brake hydraulic pressure control system.

In FIG. 1, brake application effort produced by the operation of a brake pedal by the occupant of a vehicle is inputted into a master cylinder M which is a primary hydraulic pressure generating source which outputs a hydraulic pressure in accordance with the degree of operation of the brake pedal. The master cylinder M is configured into a tandem type one and includes a primary output port 3 which deals with a left front wheel disc brake BA and a right rear wheel disc brake BB which are wheel brakes and a secondary output port 4 which deals with a right front wheel disc brake (not shown) and a left rear wheel disc brake (not shown) which are wheel brakes, the primary and secondary output ports 3, 4 being connected to the respective disc brakes BA, BB, . . . via a hydraulic pressure control unit 5.

A section of the hydraulic pressure control unit 5 which deals with the primary output port 3 and a section which deals with the secondary output port 4 are such as to have the same configuration, and hence, hereinafter, only the section of the hydraulic pressure control unit 5 which deals with the primary output port 3 will be described, thus the description of the section of the hydraulic pressure control unit 5 which deals with the secondary output port 4 being omitted.

The hydraulic pressure control unit 5 includes:

a hydraulic pressure path 6 which is common to the left front wheel disc brake BA and the right rear wheel disc brake BB, a regulator valve 7 as a normally open solenoid valve which is provided to be interposed between the hydraulic pressure path 6 and the primary output port 3, a one-way valve 8 which is provided parallel to the regulator valve 7 in such a manner as to permit a flow or passage of brake fluid to the hydraulic pressure path 6 side, an inlet valve 9 which is provided to be interposed between the hydraulic pressure path 6 and the left front wheel disc brake BA, an inlet valve 10 which is provided to be interposed between the hydraulic pressure path 6 and the right rear wheel disc brake BB, one-way valves 11, 12 which are connected parallel, respectively, to the inlet valves 9, 10 in such a manner as to permit a flow of brake fluid to the hydraulic pressure path 6 side, a single reservoir 13 which is common to the left front wheel disc brake BA and the right rear wheel disc brake BB, an outlet valve 14 which is provided to be interposed between the left front wheel disc brake BA and the reservoir 13, an outlet valve 15 which is provided to be interposed between the right rear wheel disc brake BB and the reservoir 13, a pump 18 which is connected to the reservoir 13 via a one-way valve 16 on a suction side thereof, a damper 19 which is connected to a discharge side of the pump, an orifice 20 which is provided between the damper 19 and the hydraulic pressure path 6, and a suction valve 21 which is provided between an intermediate position between the suction side of the pump 18 and the one-way valve 16 and the primary output port 3.

The pump 18 is driven by an electric motor 17 whose rotational speed can be changed by changing a drive duty, and this electric motor 17 is common to the section dealing with the primary output port 3 and the section dealing with the secondary output port 4 of the hydraulic pressure control unit 5.

The regulator valve 7 and the inlet valves 9, 10 are normally open linear solenoid valves, the outlet valves 14, normally closed linear solenoid valves and the suction valve 21 a normally closed solenoid valve. In addition, a master cylinder output hydraulic pressure detector 22 is connected to an intermediate position between the primary output port 3 and the regulator valve 7 for detecting an output hydraulic pressure from the master cylinder M, and brake hydraulic pressure detectors 23, 24 are connected, respectively, to intermediate positions between the inlet valves 9, 10 and the left front wheel disc brake BA and the right rear wheel disc brake BB for detecting brake hydraulic pressures exerted, respectively, on the left front wheel disc brake BA and the right rear wheel disc brake BB.

Thus, the inlet valve 9 and the outlet valve 14 makes up an operation mode switching valve module 25 for switching operation modes between:

a pressure build-up mode for establishing a connection between the hydraulic pressure path 6 and the left front wheel disc brake BA with the inlet valve 9 opened and the outlet valve 14 closed, a pressure reducing mode for interrupting a connection between the left front wheel disc brake BA and the reservoir 13 while establishing a connection between the left front wheel disc brake BA and the reservoir 13 with the inlet valve 9 closed and the outlet valve 14 opened, and a pressure holding mode for disconnecting the hydraulic pressure path 6 and the reservoir 13 from the left front wheel disc brake BA with the inlet valve 9 and the outlet valve 14 both closed.

Accordingly, in the pressure build-up mode, the hydraulic pressure in the hydraulic pressure path 6 is exerted on the left front wheel disc brake BA, in the pressure reducing mode, the hydraulic pressure at the left front wheel disc brake BA is released to the reservoir 13, and in the pressure holding mode, the hydraulic pressure at the left front wheel disc brake BA is held.

In addition, the inlet valve 10 and the outlet valve 15 make up an operation mode switching valve module 26 for switching operation modes between:

a pressure build-up mode for establishing a connection between the hydraulic pressure path 6 and the right rear wheel disc brake BB with the inlet valve 10 opened and the outlet valve 15 closed, a pressure reducing mode for interrupting a connection between the right rear wheel disc brake BB and the reservoir 13 while establishing a connection between the right rear wheel disc brake BB and the reservoir 13 with the inlet valve 10 closed and the outlet valve 15 opened, and a pressure holding mode for disconnecting the hydraulic pressure path 6 and the reservoir 13 from the right rear wheel disc brake BB with the inlet valve 10 and the outlet valve 15 both closed.

Accordingly, in the pressure build-up mode, the hydraulic pressure in the hydraulic pressure path 6 is exerted on the right rear wheel disc brake BB, in the pressure reducing mode, the hydraulic pressure at the right rear wheel disc brake BB is released to the reservoir 13, and in the pressure holding mode, the hydraulic pressure at the right rear wheel disc brake BB is held.

In the hydraulic pressure control unit 5 configured as has been described above, by activating the electric motor 17 to operate with the suction valve 21 energized to open, the pump 18 discharges brake fluid that it has taken in from the master cylinder M side and pressurized to a portion of the hydraulic pressure path 6 which lies between the regulator valve 7 and the inlet valves 9, 10. As this occurs, by controlling the operation of the regulator valve 7, the hydraulic pressure in the hydraulic pressure path 6 can be adjusted.

Namely, the pump 18 and the regulator valve 7 exert the adjusted hydraulic pressure to the hydraulic pressure path 6 when the brakes are not applied. By controlling the hydraulic pressure by the inlet valves 9, 10 and the outlet valves 14, of the switching valve modules 25, 26, brake hydraulic pressures which are different from each other can be exerted on the left front wheel disc brake BA and the right rear wheel disc brake BB. Therefore, it becomes possible to effect a brake control such as a behavior stabilizing control or a traction control while the vehicle is running. As this occurs, the regulator valve 7 is controlled so that the hydraulic pressure in the hydraulic pressure path 6 becomes a value corresponding to the brake hydraulic pressure of the disc brake of the left front wheel disc brake BA and the right rear wheel disc brake BB for which a high hydraulic pressure is required. Moreover, in controlling the disc brake of the left front wheel disc brake BA and the right rear wheel disc brake BB for which the high hydraulic pressure is required, there may occur a case where switching between the pressure build-up mode, the pressure reducing mode and the pressure holding mode is effected by controlling the regulator valve 7 to open or close.

In addition, when the service brake is applied, the operation of the electric motor 7 is stopped and the suction valve 21 is closed while the regulator valve 7 is opened, and by effecting an anti-lock braking control in which of the switching valve modules 25, 26, the switching valve module is controlled which deals with the wheel which is liable to be put in a locked state when the service brake is applied, the service brake is applied with good efficiency without locking the wheel.

The regulator valve 7, the inlet valves 9, 10, the outlet valves 14, 15, the electric motor 7 and the suction valve 21 of the hydraulic pressure control unit 5 are such as to be controlled by a controller C, and detection values of the master cylinder output hydraulic pressure detector 22 and the brake hydraulic pressure detectors 23, 24 are inputted into the controller C.

Figure 2:
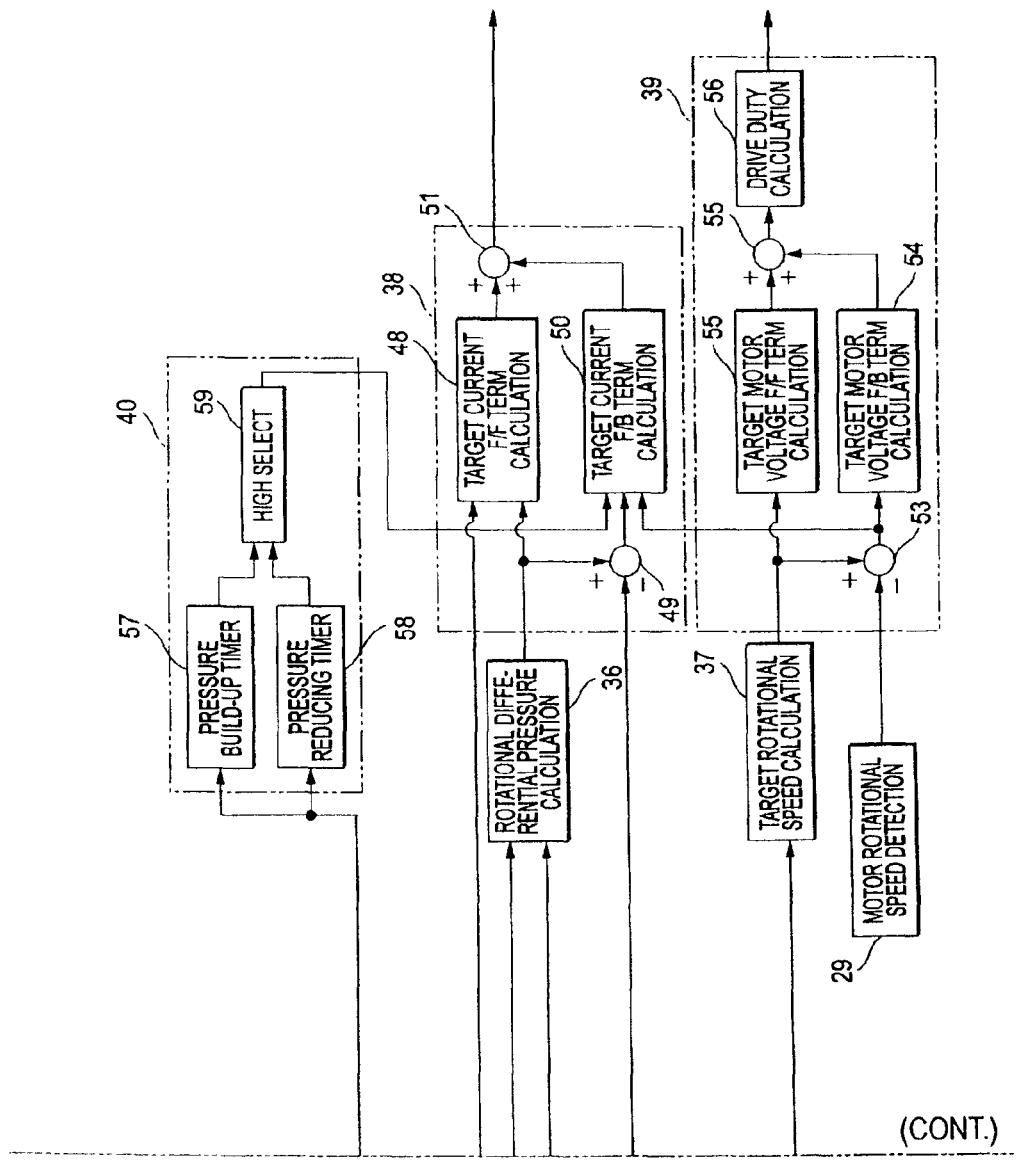
FIG. 2 is a block diagram showing a partial configuration of a controller.

In FIG. 2, a section in the controller C which is related to the left front wheel disc brake BA includes:

a motor rotational speed detecting module 29 for detecting a rotational speed of the electric motor 17, a target wheel brake pressure setting module 30 for setting a target hydraulic pressure for the left front wheel disc brake BA, a target fluid amount operating module 31 for obtaining a target fluid amount for the left front wheel brake BA based on the target hydraulic pressure set by the target wheel brake pressure setting module 30, an actual fluid amount operating module 32 for obtaining an actual fluid amount of the left front wheel brake disc BA based on a hydraulic pressure detected by the brake hydraulic pressure detector 23, an actual differential pressure operating module 33 for calculating a differential pressure between before and after the control target valve of the regulator valve 7, the inlet valve 9 and the outlet valve 14 of the hydraulic pressure control unit 5, a target flow rate calculating unit 34 for obtaining a target flow rate for the left front wheel disc brake BA based on the target fluid amount obtained by the target fluid amount operating module 31 and the actual fluid amount obtained by the actual fluid amount operating module 32, a hydraulic pressure control unit target controlled variable setting unit 35 for determining an operation amount of the hydraulic pressure control unit 5 as well as determining the control mode of the hydraulic pressure control unit 5 based on the results of operation in the target flow rate calculating unit 34, a target differential pressure operating module 36 for calculating a difference between the target hydraulic pressure determined by the target wheel brake pressure module 30 and the actual hydraulic pressure, a target rotational speed operating module 37 as a target rotational speed setting unit for calculating a target rotational speed for the pump 18 based on the results of operation in the target controlled variable setting unit 35, a control current calculating unit 38 for calculating a control current that is to be applied to the control target valve of the hydraulic pressure control unit 5 based on the results of operation in the hydraulic pressure control unit target controlled variable setting unit 35, a drive duty calculating unit 39 for calculating a drive duty for the electric motor 17 based the results of operation in the target rotational speed operating module 37 and an actual motor rotational speed detected by the motor rotational speed detecting module 29, and a timer unit 40 for measuring the amount of time taken based on the control mode of the hydraulic pressure control unit 5 which is determined by the hydraulic pressure control unit target controlled variable setting unit 35.

Figure 3:
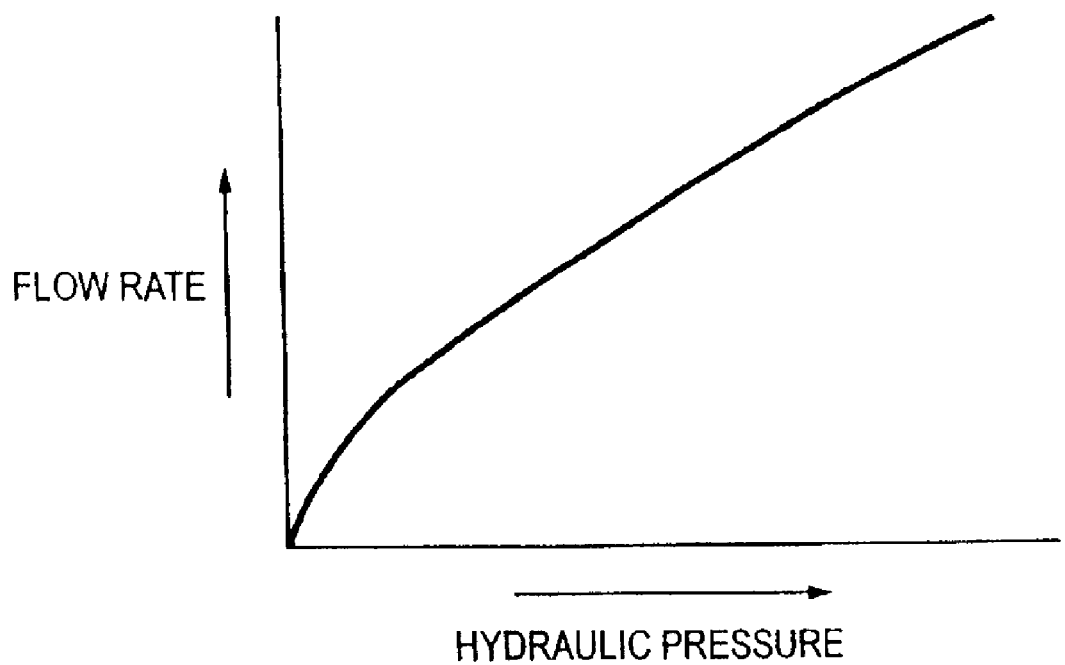
FIG. 3 is a diagram showing a relationship between hydraulic pressure and fluid amount.

The target fluid amount operating module 31 and the actual fluid amount operating module 32 calculates fluid amounts according to hydraulic pressures by following a preset map as shown in FIG. 3. In addition, the actual differential pressure operating module 33 detects a differential pressure between before and after each of the regulator valve 7, the inlet valve 9 and the outlet valve 14 of the hydraulic pressure control unit 5, and when the hydraulic pressure in the hydraulic pressure path 6 is adjusted by the regulator valve 7 while keeping the inlet valve 9 and the outlet valve 14 opened and closed, respectively, the output hydraulic pressure of the master cylinder M which is detected by the master cylinder output hydraulic pressure detector 22 and the higher hydraulic pressure of the brake hydraulic pressures of the left front wheel disc brake BA and the right rear wheel disc brake BB which are detected by the brake hydraulic pressure detectors 23, 24 are inputted into the actual differential pressure operating module 33, and the actual differential pressure operating module 33 calculates an actual differential pressure between before and after the regulator valve 7. In addition, when the inlet valve 9 and the outlet valve 14 are controlled to open or close while keeping the regulator valve 7 opened, the output hydraulic pressure of the master cylinder M which is detected by the master cylinder output hydraulic pressure detector 22 and the brake hydraulic pressure of the left front wheel disc brake BA which is detected by the brake hydraulic pressure detector 23 are inputted into the actual differential pressure operating module 33, and the actual differential pressure operating module 33 calculates an actual differential pressure between before and after each of the inlet valve 9 and the outlet valve 14.

In FIG. 2, the target flow rate calculating unit 34 includes:

an F/F term operating module 41 for obtaining a feedforward (F/F) term by differentiating the target fluid amount obtained by the target fluid amount operating module 31, a summing point 42 where the actual fluid amount obtained by the actual fluid amount operating module 32 is subtracted from the target fluid amount obtained by the target fluid amount operating module 31, an F/B term operating module 43 for calculating a feedback (F/B) term from the differential fluid amount (the target fluid amount–the actual fluid amount) obtained in the summing point 42, and a summing point 44 where the F/B term obtained in the F/B term operating module 43 to the F/F term obtained in the F/F term operating module 41.

According to the target flow rate calculating unit 34, the target flow rate for the left front wheel disc brake BA is outputted from the summing point 44.

The hydraulic pressure control unit target controlled variable setting unit 35 includes:

a control mode operating module 45 for determining the control mode of the hydraulic pressure control unit 5 by the target flow rate which is inputted from the target flow rate calculating unit 34, a valve flow rate operating module 46 for calculating a target valve flow rate for the regulator valve 7, the inlet valve 9 or the outlet valve 14 based on the target flow rate inputted from the target flow rare calculating unit 34 and the control mode determined in the control mode operating module 45, and a target discharge amount operating module 47 for calculating a target discharge amount for the pump 18 based on the control mode determined in the control mode operating module 45 and the flow rate operated in the valve flow rate operating module 46.

Thus, the control mode operating module 45 switches the control mode to the pressure build-up mode, the pressure reducing mode or to the pressure holding mode based on the sign and absolute value of the target flow rate obtained in the target flow rate calculating unit 34.

Figure 4A:
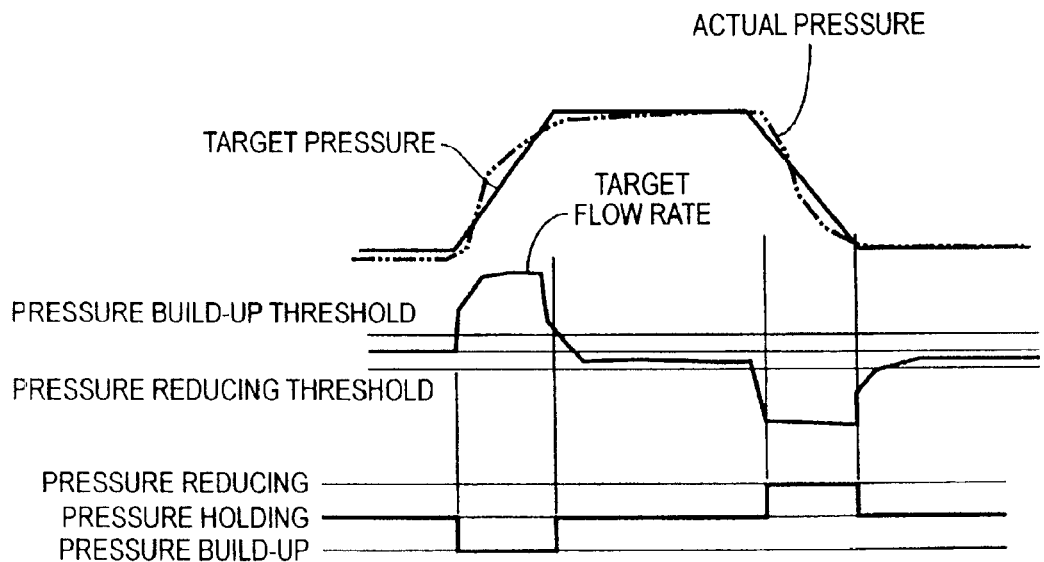
FIG. 4 is Timing charts which explains a control mode determination method through a comparison with a conventional method.

When the target flow rate changes as shown in FIG. 4A, when a positive side value of the target flow rate surpasses a pressure-build up threshold, the control mode is shifted to the pressure build-up mode, when the positive side value becomes equal to or less than the pressure build-up threshold, the control mode is shifted from the pressure build-up mode to the pressure holding mode, while when a negative side value of the target flow rate becomes less than a pressure reducing threshold, the control mode is shifted from the pressure reducing mode to the pressure holding mode, and when the negative side value of the target flow rate becomes equal to or more than the pressure reducing threshold, the control mode is shifted from the pressure reducing mode to the pressure holding mode.

Figure 4B:
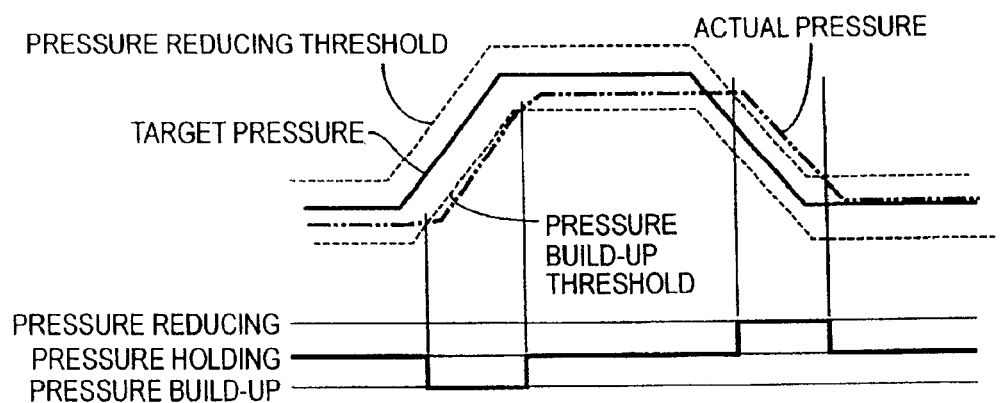

In contrast to this, with the conventional one, as shown in FIG. 4B, the control mode is shifted to the pressure build-up mode in response to the actual pressure becoming less than the pressure build-up threshold which is set lower than the target pressure, the control mode is shifted from the pressure build-up mode to the pressure holding mode in response to the actual pressure becoming equal to or more than the pressure build-up threshold, the control mode is shifted from the pressure holding mode to the pressure reducing mode in response to the actual pressure surpassing the pressure reducing threshold which is set higher than the target pressure, and furthermore, the control mode is shifted from the pressure reducing mode to the pressure holding mode in response to the actual pressure becoming equal to or less than the pressure reducing threshold.

Incidentally, according to the conventional control mode switching based on the actual pressure, although the problem is caused which has been described in relation to FIG. 16, according to the control mode switching based on the sign and absolute value of the target flow rate, as shown in FIG. 4A, the actual pressure can be changed in a linear manner with no direct reference to the magnitude of the actual and target hydraulic pressures, whereby the control accuracy can be made compatible with the response.

In FIG. 2, the control current calculating unit 38 includes:

a target current F/F term operating module 48 for calculating a target current feedforward (F/F) term for the regulator valve 7, the inlet valve 9 or the outlet valve 14 based on the target valve flow rate obtained in the valve flow rate operating module 46 of the hydraulic pressure control unit target controlled variable setting unit 35 and the target differential pressure obtained in the target differential pressure operating module 36, a summing point 49 where the actual differential pressure obtained in the actual differential pressure operating module 33 is subtracted from the target differential pressure obtained in the target differential pressure operating module 36, a target current F/B term operating module 50 for calculating a feedback (F/B) term of the target current based on the differential pressure deviation obtained in the summing point 49, and a summing point 51 for adding the F/B term obtained in the target current F/B term obtaining module 50 to the F/F term obtained in the target current F/F term operating module 48.

The target current for the regulator valve 7, the inlet valve 9 or the outlet valve 14 is outputted from the summing point 51.

Figure 5A:
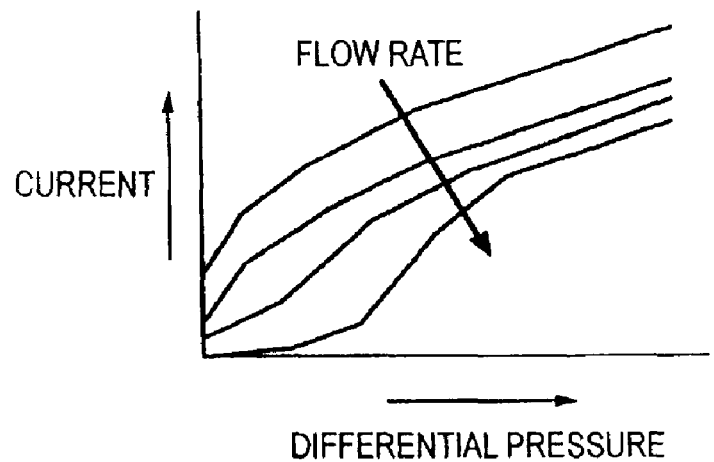
FIG. 5A is a diagram showing a map for determining current for a regulator valve 7 and inlet valve 9 according to the present invention.
Figure 5B:
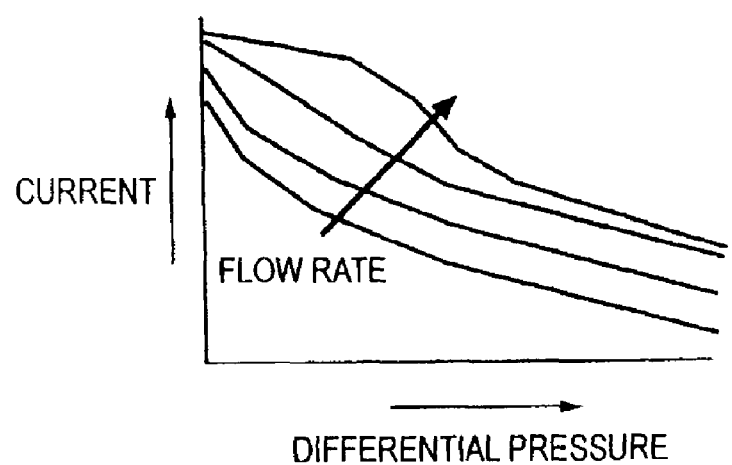
FIG. 5B is a diagram showing a map for determining current for an outlet valve 14 according to the present invention.
Figure 5C:
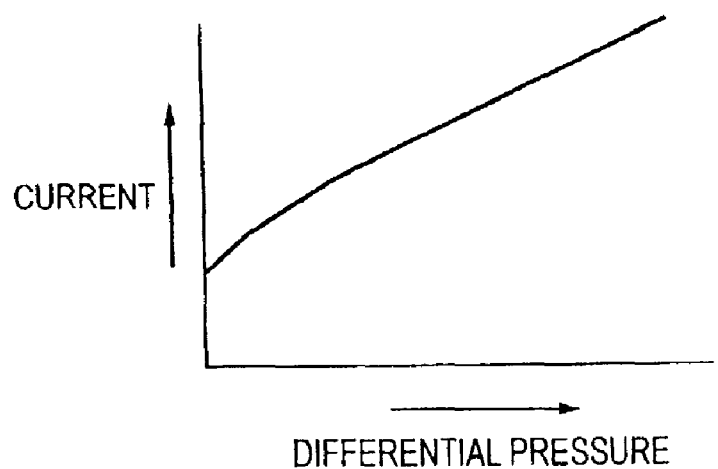
FIG. 5C is a diagram showing a map for determining current for linear solenoid valves according to the conventional control.

Incidentally, although the control current for controlling in a linear manner the regulator valve 7, the inlet valve 9 or the outlet valve 14, which is the linear solenoid valve, is in general made to be obtained through typical table searches for differential pressure-current characteristics shown in FIG. 5(c) which are associated with flow rate, the characteristics of the linear solenoid valve are such as to change with flow rate, and the response is affected largely by the F/F control. Then, the target current F/F term operating module 48 is made to obtain a control current by following a pre set characteristic map of differential pressure-flow rate-current using the target valve flow rate obtained by the valve flow rate operating module 46. The target current F/F term operating module 48 obtains a control current for the regulator valve 7 and the inlet valve 9 by following a characteristic map of differential pressure-flow rate-current as shown in FIG. 5(a) in which with differential pressure remaining constant, current decreases as flow rate increases, and the target current F/F term operating module 48 obtains a control current for the outlet valve 14 by following a characteristic map of differential pressure-flow rate-current as shown in FIG. 5(b) in which with the differential pressure remaining constant, current increases as flow rate increases.

In this way, the control current for the regulator valve 7, the inlet valve 9 or the outlet valve 14 is determined based on the difference between the hydraulic pressure detected in the brake hydraulic pressure detector 23 and the target pressure which is set in target wheel brake pressure setting module 30 and the target flow rate obtained in the target flow rate calculating unit 34, and the regulator valve 7, the inlet valve 9 or the outlet valve 14 is controlled in a linear manner by the control current so determined.

Figure 6A:
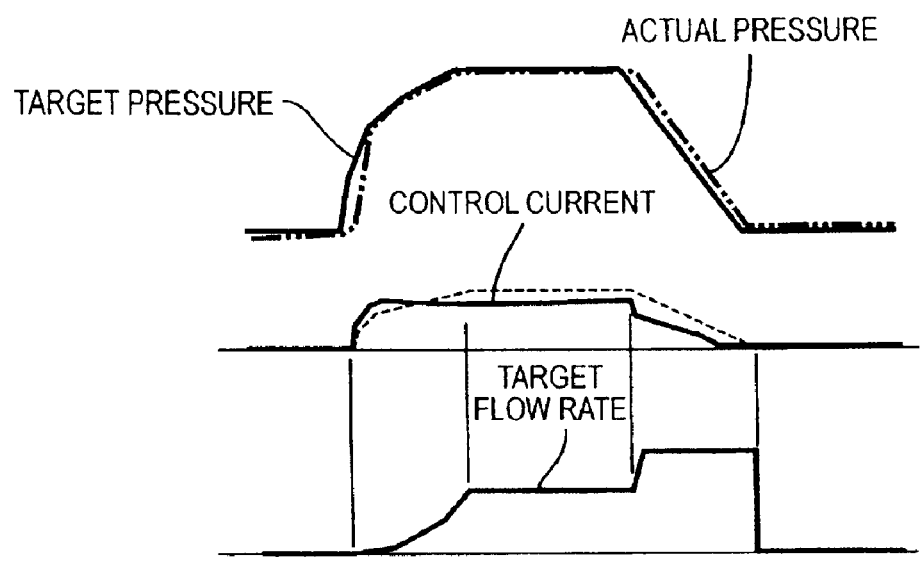
FIG. 6A is a diagram showing a timing chart which illustrates the follow-up capability of an actual pressure to a target pressure by a change in control current according to the present invention.
Figure 6B:
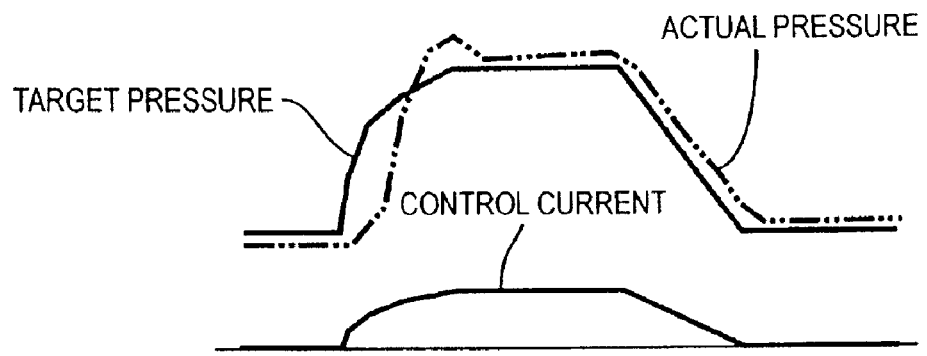
FIG. 6B is a diagram showing a timing chart which illustrates the follow-up capability of an actual pressure to a target pressure by a change in control current according to the conventional control.

Here, when the lamp response whose inclination changes is controlled, for example, by opening or closing the regulator valve 7, according to the conventional typical approach in which the control current is based on the flow rate, as shown in FIG. 6(b), it is difficult to ensure that the actual pressure can be made to change appropriately with target pressure. However, in the event that the control current is made to change in accordance with a change in the target valve flow rate, as shown in FIG. 6(a), the actual pressure can be made to change appropriately with target pressure, whereby the control performance is enhanced.

In FIG. 2, the target rotational speed operating module 37 calculates a target rotational speed for the electric motor 17 based on the target discharge amount for the pump which is obtained in the target discharge amount operating module 47 in the hydraulic pressure control unit target controlled variable setting unit 35.

The drive duty calculating unit 39 includes:

a target motor voltage F/F term operating module 52 for calculating a target drive voltage feedforward (F/F) term for the electric motor 17 based on the target rotational speed obtained in the target rotational speed operating module 37, a summing point 53 where the actual motor rotational speed which is the actual rotational speed of the electric motor 17 is subtracted from the target rotational speed obtained in the target rotational speed operating module 37, a target motor voltage F/B term operating module 54 for calculating a target drive voltage feedback (F/B) term for the electric motor 17 based on the rotational speed deviation obtained in the summing point 53, a summing point 55 where the F/B term obtained in the target motor voltage F/B term operating module 54 is added to the F/F term obtained in the target motor voltage F/F term operating module 52, and a drive duty operating module 56 for calculating a drive duty based on the drive voltage obtained in the summing point 55.

Therefore, the electric motor 17 is controlled by the drive duty obtained in the drive duty operating module 56.

Figure 7:
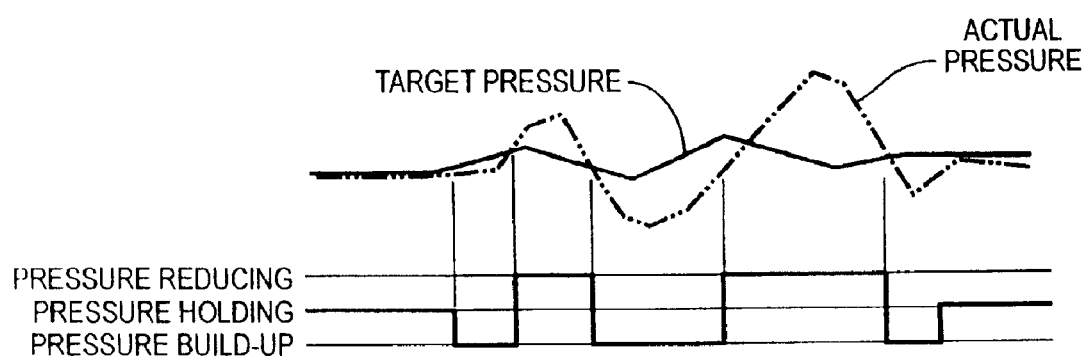
FIG. 7 is a diagram showing a state in which the actual pressure starts to vibrate in association with the target pressure starting to vibrate.

Incidentally, although response and high accuracy can be made compatible with each other by the hydraulic pressure control which introduces thereinto the concept of flow rate as has been described above, in the event that the target hydraulic pressure itself contains vibrations, as shown in FIG. 7, there may occur a case where vibrations are promoted by high accuracy on the contrary. In particular, when the pressure is built up or reduced using the switching valve modules 25, 26 which are made up of the inlet valves 9, 10 and the outlet valves 14, 15, respectively, since the inlet valves 9, 10 and the outlet valves 14, 15 are switched alternately to be opened or closed, vibrations are easy to be promoted. Then, in the event that vibrations are detected in the target hydraulic pressure, by changing a F/B gain in the operation in the target current F/B term operating module 50 of the control current calculating unit 38, the vibrations can be reduced effectively.

Namely, the F/B gain in the operation in the target current F/B term operating module 50 is such as to change with the results of measuring the amount of time in the timer unit 40, and the timer unit 40 includes a pressure build-up timer 57 and a pressure reducing timer 58 which are adapted to count in response to a signal from the control mode operating module 45 of the hydraulic pressure control unit target controlled variable setting unit and a high select module 59 for high selecting count values of the pressure build-up timer 57 and the pressure reducing timer 58.

The pressure build-up timer 57 implements counting up normally except when a count value is cleared to "0" when the hydraulic pressure control unit 5 is controlled to shift from the pressure build-up mode to the pressure reducing mode or to the pressure holding mode so as to obtain a count value TM_MDCAL_Z. The pressure reducing timer 58 implements counting up normally except when a count value is cleared to "0" when the hydraulic pressure control unit 5 is controlled to shift from the pressure reducing mode to the pressure build-up mode or to the pressure holding mode so as to obtain a count value TM_MDCAL_G. A high select value TM_MDCAL of those count values TM_MDCAL_Z and TM_MDCAL_G is obtained in the high select module 59.

Figure 8:
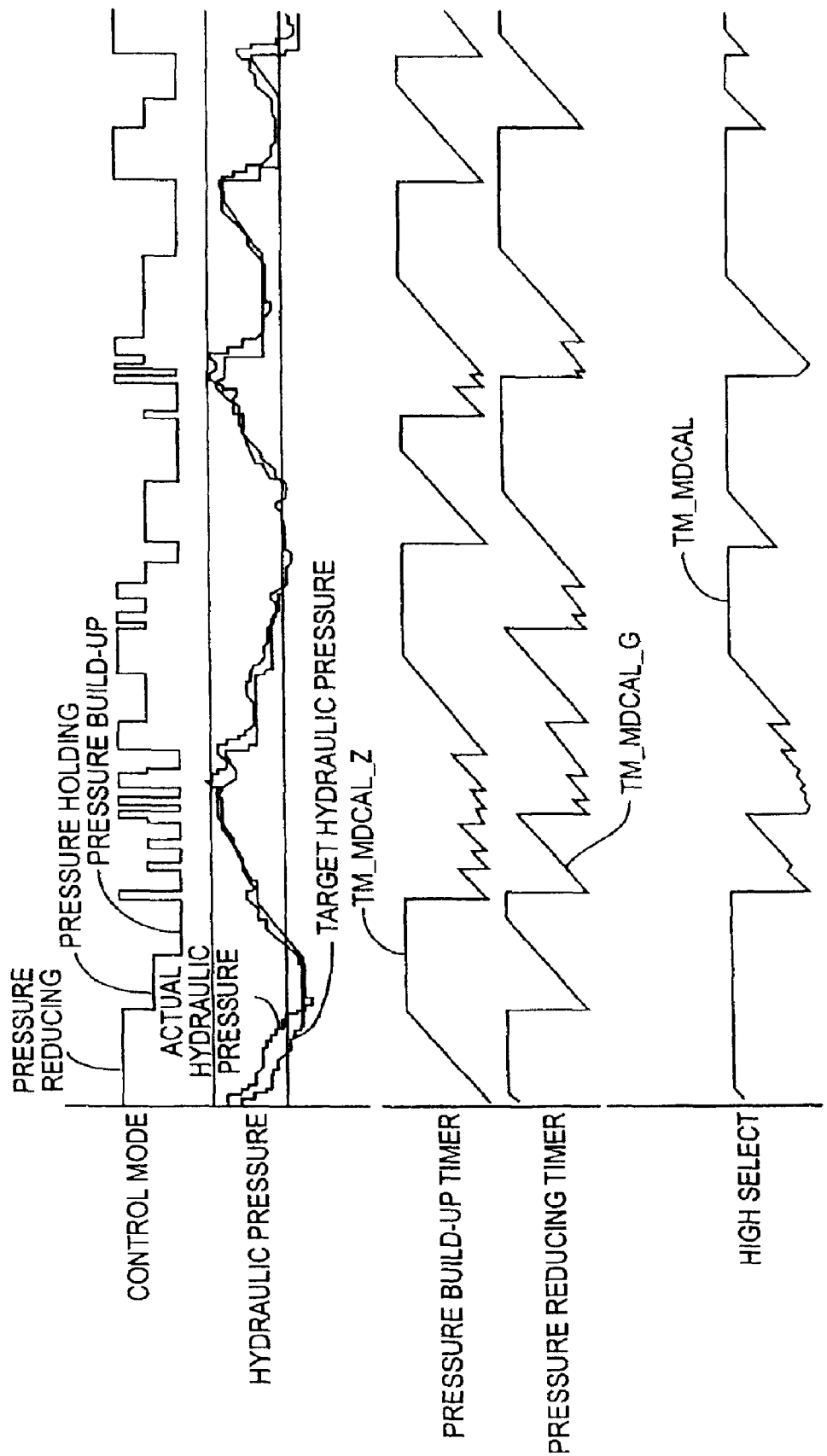
FIG. 8 is a timing chart which illustrates changes in control mode, target pressure, actual pressure and timer count values.

Thus, as shown in FIG. 8, it can be determined that no hunting is generated when the high select value TM_MDCAL is large, while when the high select value TM_MDCAL is small, hunting is generated.

Figure 9:
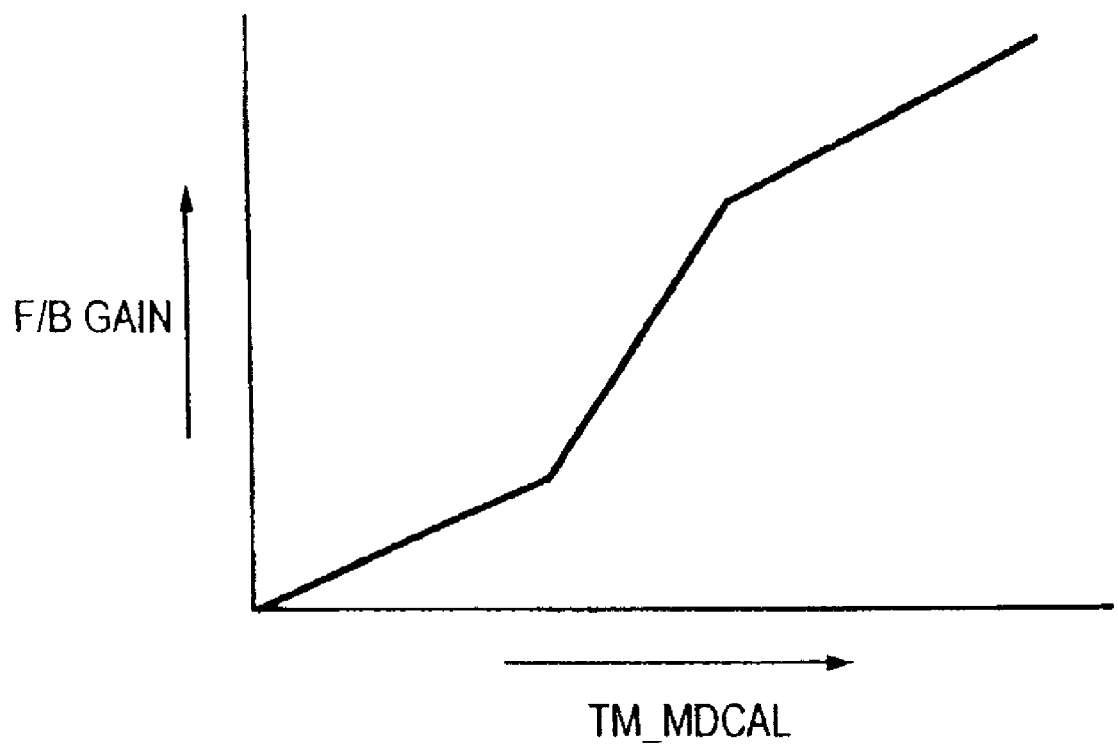
FIG. 9 is a diagram showing a change in F/B gain relative to a high select value.

Then, the high select value TM_MDCAL is inputted into the target current F/B term operating module 50 of the control current calculating unit 38 from the high select module 59 of the timer unit 40, and in the target current F/B term operating module 50, as shown in FIG. 9, the F/B gain changes in such a manner as to increase as the high select value TM_MDCAL increases. Namely, when hunting is liable to be generated, the controlled variable of the regulator valve 7, the inlet valves 9, 10 or the outlet valves 14, 15 is increased by increasing the F/B gain, whereby the hydraulic pressure control is enabled without promoting vibrations. Moreover, since the F/B gain is not such as to be switched depending upon the existence of hunting but such as to change continuously with change in the high select value TM_MDCAL, a smooth hydraulic pressure control can be realized, and robustness is enhanced.

Figure 10A:
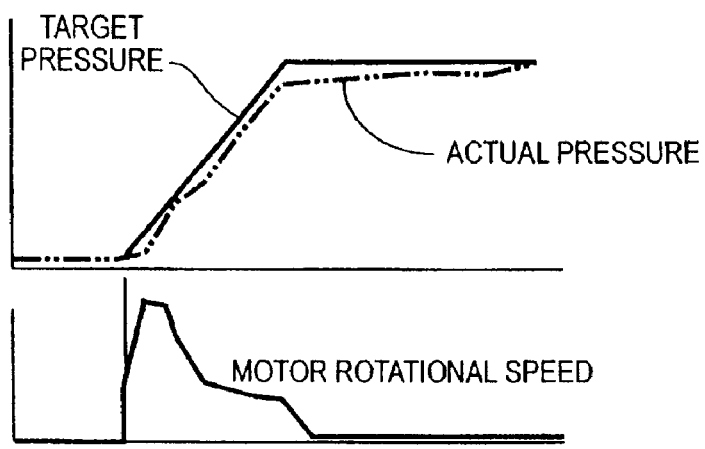
FIG. 10A is a diagram which illustrates the follow-up capability of the actual pressure to the target pressure by a change in rotational speed of an electric motor according to the present invention.
Figure 10B:
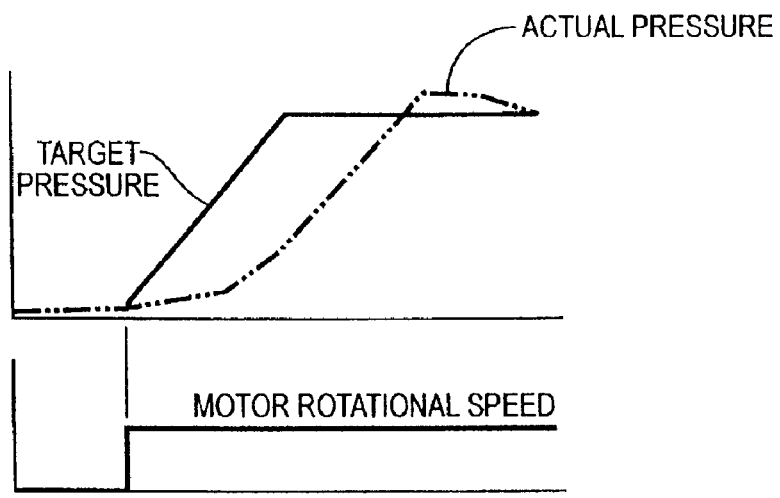
FIG. 10B is a diagram which illustrates the follow-up capability of the actual pressure to the target pressure by a change in rotational speed of an electric motor according to the conventional control.

Incidentally, operation noise and vibrations which are generated during the hydraulic pressure control are largely affected by the rotational speed of the electric motor 17 which drives the pump 18. Then, it has generally been performed that the rotational speed of the electric motor 17 is reduced in order to reduce the operation noise. However, although the operation noise is reduced by reducing the rotational speed of the electric motor 17, a pressurizing response is reduced as shown in FIG. 10(b). However, since the target rotational speed operating module 37 is such as to operate a target rotational speed for the electric motor 17 based on the target discharge mount of the pump 18 and the rotational speed of the electric motor 17 is controlled by operating the drive duty of the electric motor 17 by the drive duty calculating unit 39 based on the target rotational speed so operated, the response can be increased while maintaining quietness by reducing the operation noise, as shown in FIG. 10(a). Moreover, optimizing the discharge amount of the pump 18 can contribute to increasing the hydraulic pressure control accuracy.

In addition, in a case where a self pressure build-up control is implemented by the regulator valve 7, when implementing a feedback by hydraulic pressure in order to increase the control accuracy, the F/B gain is required to be increased in order to increase the controlled variable of the regulator valve 7.

Figure 11A:
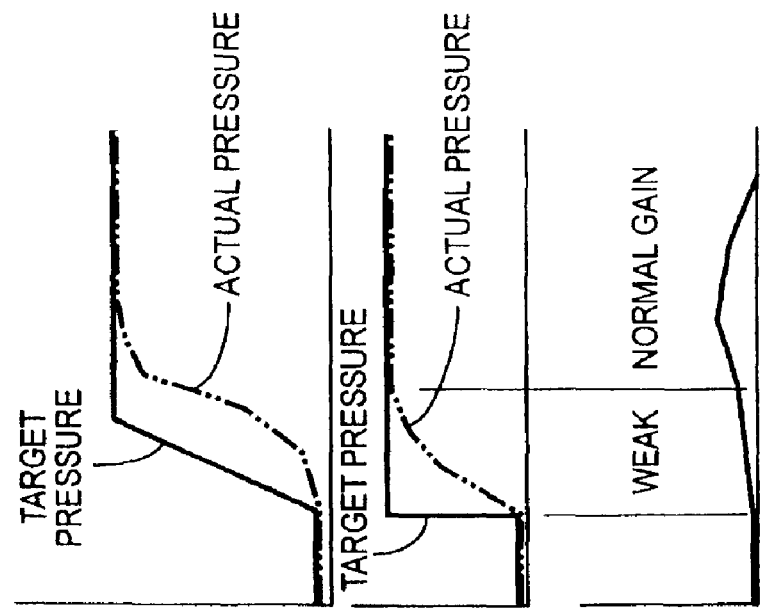
FIG. 11A is a diagram which illustrates the follow-up capability of the actual pressure to the target pressure by a change in F/B gain of a regulator valve according to the present invention.
Figure 11B:
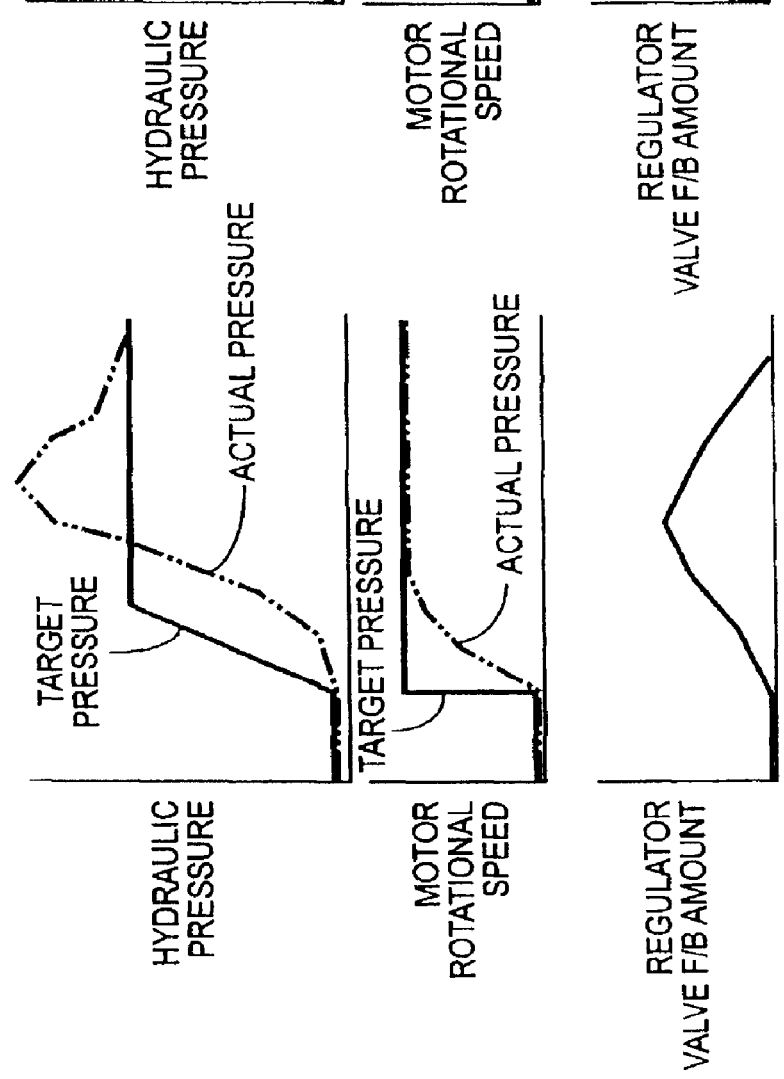
FIG. 11B is Diagrams which illustrate the follow-up capability of the actual pressure to the target pressure by a change in F/B gain of a regulator valve according to the conventional control.

However, the self pressure build-up is implemented by adjusting the hydraulic pressure discharged from the pump 18 by the regulator valve 7, and in such a state that the discharge amount from the pump 18 has not yet reached a predetermined value in an initial stage of the control, there is no case where the pressure build-up is improved even by feedback on the regulator valve 7 side. On the contrary, in the event that the F/B gain is increased as shown in FIG. 11(b) in such a state, since an excessive F/B gain is operated by a large hydraulic pressure deviation and an overshoot occurs when the discharge amount has reached the predetermined value, the F/B gain cannot be increased to become large.

Figure 12:
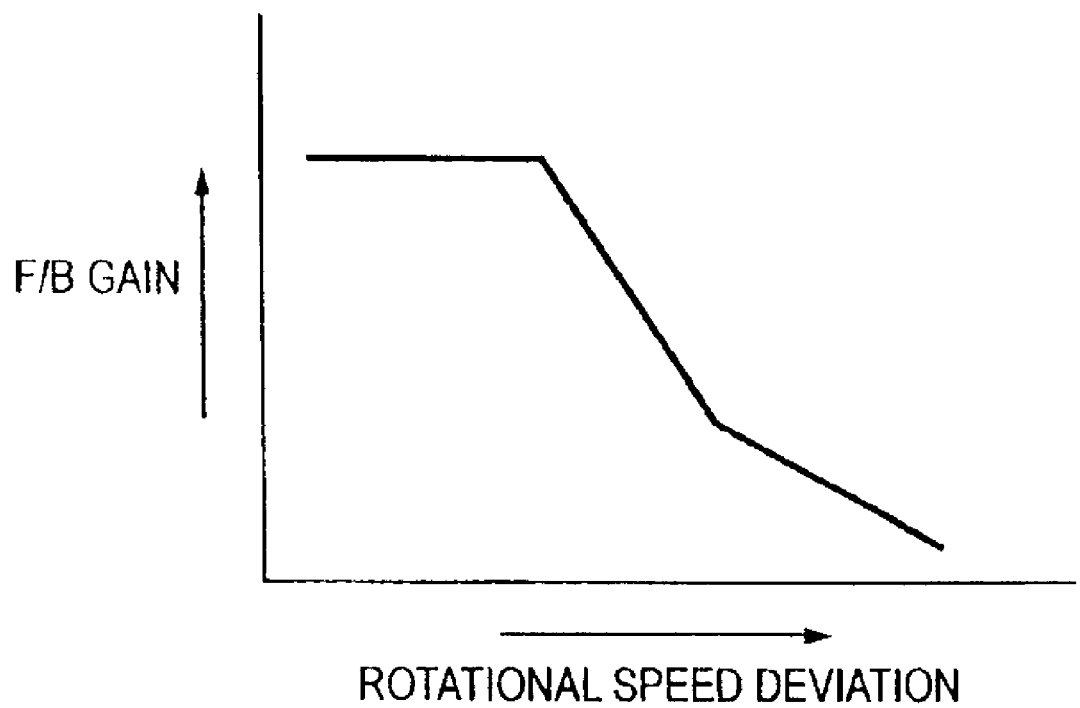
FIG. 12 is a diagram showing a change in F/B gain relative to a deviation in rotational speed.

Then, as shown in FIG. 2, the rotational speed deviation (the target rotational speed obtained in the target rotational speed operating module 37—the actual motor rotational speed) which is obtained in the summing point 53 of the drive duty calculating unit 39 is inputted into the target current F/B term operating module 48. In the target current F/B term operating module 48, as shown in FIG. 12, when the rotational speed deviation is large, the F/B gain changes in such a manner as to become smaller than when the rotational speed deviation is small, whereby the F/B gain of the regulator valve 7. That is, the controlled variable of the regulator valve 7 decreases as shown in FIG. 11(a) in an unnecessary portion. Thus, even when the discharge amount of the pump 18 reaches the predetermined value, the generation of overshoot is suppressed.

Although the rotational speed of the electric motor 17 changes freely as has been described above, in order for the rotational speed of the electric motor 17 to be allowed to change in an arbitrary manner in reality, both driving and braking of the electric motor 17 have to be controlled.

Figure 13B:
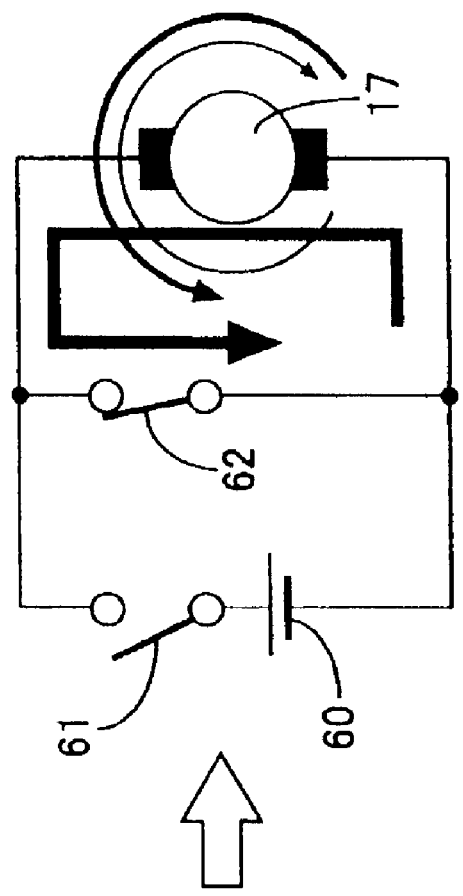
FIG. 13B is a diagram which illustrates a driving circuit of the electric motor.
Figure 13A:
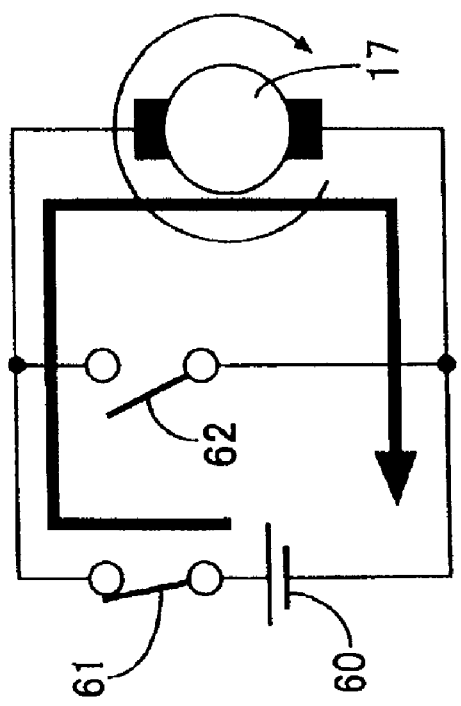
FIG. 13A is a diagram which illustrates a driving circuit of the electric motor.

In particular, although the braking side can be realized by implementing positive and negative controls by an H bridge or the like, there can be provided a large advantage even by only braking by an electric circuit as shown in FIG. 13. Namely, a series circuit made up of a battery 60 and a switch 61 is connected to both terminals of the electric motor 17, and a switch 62 for short-circuiting between both the terminals of the electric motor 17 is connected thereto in parallel to the series circuit. When the electric motor 17 is in operation, as shown in FIG. 13(a), the switch 61 is closed to make the connection in the circuit, whereas the switch 62 is opened to break the connection, and when the electric motor 17 is braked, as shown in FIG. 13(b), the switch 61 is opened to break the connection in the circuit, whereas the switch 62 is closed to make the connection, so that a motor brake state is obtained.

Figure 14:
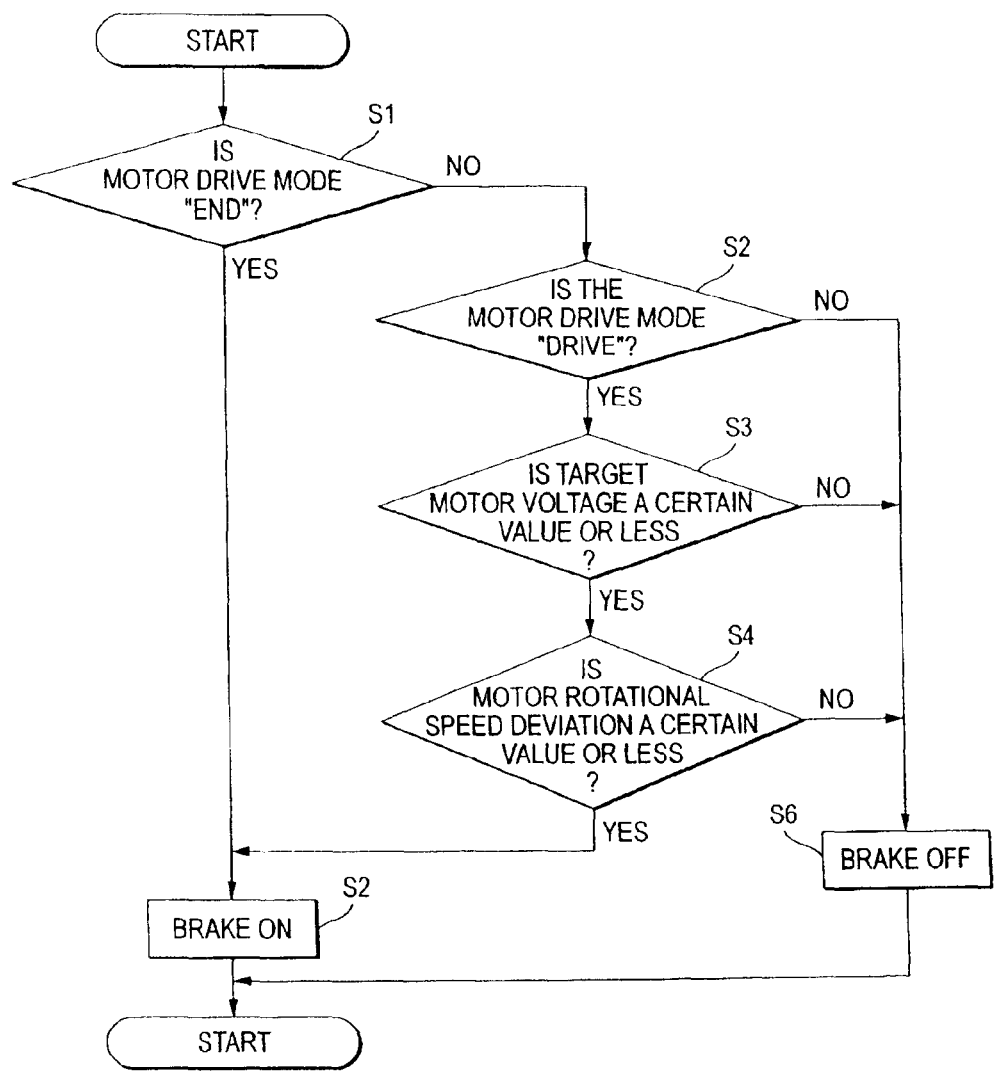
FIG. 14 is a flowchart which illustrates a control procedure of the electric motor.

The implementation of the ON/OFF switching in this way without controlling the motor brake amount can be realized by adding a simple circuit, and an effective control of deceleration can be realized by implementing the ON/OFF switching according to a control procedure shown in FIG. 14.

In FIG. 14, at step S1, whether or not the drive control mode of the electric motor 17 is an end mode is determined. Here, as drive modes for the electric motor 17, there are set modes of "stop," "drive," and "end." The "end" mode denotes a state in which although there is no drive requirement, the electric motor 17 is rotating by virtue of inertia. Thus, if the end mode is confirmed at step S1, the flow of the procedure proceeds to step S2, where a brake-applied or brake-on state is produced.

If it is determined at step S1 that the drive control mode is not the end mode, the flow proceeds to step S3, where whether or not the drive control mode of the electric motor 17 is the drive mode is determined. If it is determined that the electric motor 17 is in the drive mode, then, whether or not the target motor voltage is a certain value or less is determined at step S4. If the target motor voltage is determined to be the certain value or less, then, whether or not the motor rotational speed deviation (the target rotational speed–the actual rotational speed) is a certain value or less is determined at step 5, and if the motor rotational speed deviation is the certain value of less, the flow proceeds from step S5 to step S2, where a brake-on state is produced.

In addition, if the drive control mode of the electric motor 17 is determined not to be the drive mode but to be the stop mode at step S3, the flow proceeds from step S3 to step S6, where a brake-on state is produced. If it is determined at step S4 that although the drive control mode is the drive mode, the target motor voltage is exceeding a certain value. If it is determined at step S5 that although the drive control mode is the drive mode with the target motor voltage being the certain value or less, the motor rotational speed deviation is exceeding the certain value, a brake-off state is produced at step S6.

Figure 15:
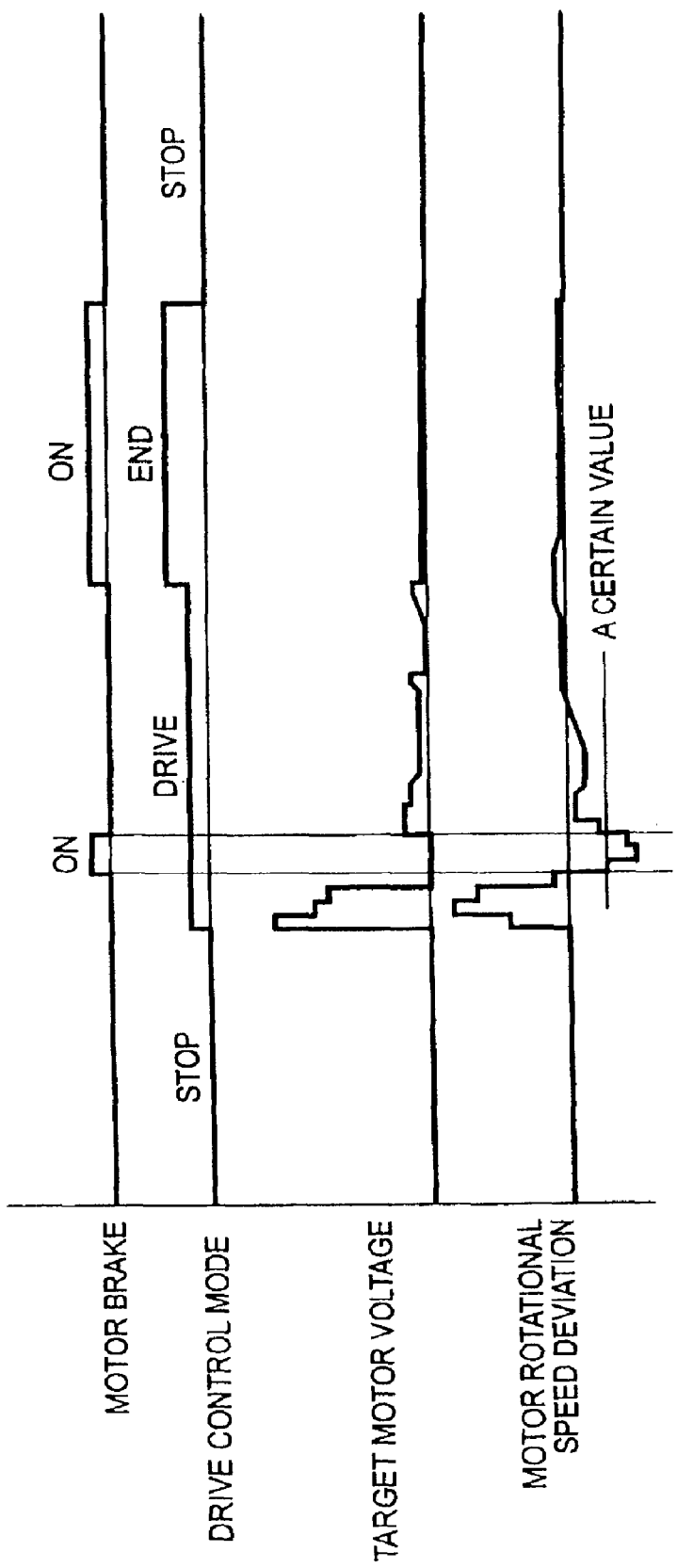
FIG. 15 is a timing charts which illustrates a state in which a motor brake of the electric motor is applied.

According to the control procedure, as shown in FIG. 15, not only is the brake-on state produced when the drive control mode is the end mode, but also the brake-on state is produced even when the drive control mode is the drive mode with the target motor voltage being the certain value of less and the motor rotational speed deviation being the certain value or less (namely, with the actual rotational speed of the electric motor 17 exceeding the target rotational speed beyond a predetermined value), whereby the deceleration response is increased.

Next, the function of the embodiment will be described. The controller C obtains target flow rates for the respective disc brakes BA, BB, . . . in the target flow rate calculating unit 34 based on the target fluid amounts of the respective wheel disc brakes including the left front wheel disc brake BA and the right rear wheel disc brake BB which are obtained in the target fluid amount operating module 31 and the actual fluid amounts of the respective disc brakes BA, BB, . . . which are obtained in the actual fluid amount operating module 32 based on the hydraulic pressures detected in the brake hydraulic pressure detectors 23, 24. The controller C also controls the operation of the hydraulic pressure control unit based on the target flow rates so obtained. Therefore, the control accuracy and response in controlling the hydraulic pressures at the respective disc brakes BA, BB . . . can be enhanced.

Namely, the necessary response in controlling the hydraulic pressures at the respective disc brakes BA, BB . . . is the lamp response, and now that it is understood that while the lamps are in response, brake fluid continues to be inputted into or outputted from the wheel brakes, by controlling the hydraulic pressures at the wheel brakes based on such continuous input or output of brake fluid, the control accuracy and response can be enhanced.

In addition, since the controller C controls the operation of the hydraulic pressure control unit 5 by switching the operation control mode to the pressure build-up mode, the pressure reducing mode or the pressure holding mode based on the signs and absolute values of the target flow rates which are obtained in the target flow rate calculating unit 34, the actual hydraulic pressures can be changed in a linear manner with no direct reference to the magnitude of the actual and target hydraulic pressures, whereby the control accuracy can be made compatible with the response.

Moreover, the current applied to the regulator valve 7, the inlet valves 9, 10 and the outlet valves 14, 15, which are the linear solenoid valves, in the hydraulic pressure control unit 5 is controlled based on the difference between the hydraulic pressures detected in the brake hydraulic pressure detectors 23, 24 and the target hydraulic pressures set in the target wheel brake pressure setting module 30 and the target flow rates obtained in the target flow rate calculating unit 34. Therefore, the control currents can be obtained in association with changes in the characteristics of the regulator valve 7, the inlet valves 9, 10 and the outlet valves 14, 15 with flow rate, thereby making it possible to enhance the control performance.

In addition, the controller C is made to include the target discharge amount operating module 47 for obtaining a target discharge amount for the pump 18 based on the target flow rates obtained in the target flow rate calculating unit 34 and the target rotational speed operating module 37 for obtaining a target rotational speed for the electric motor 17 which drives the pump 18 based on the target discharge amounts obtained in the target discharge amount operating module 47 and controls the electric motor 17 based on the target rotational speed obtained in the target rotational speed operating module 37. Therefore, the response and quietness during the hydraulic pressure control can be enhanced and a further increase in hydraulic pressure control accuracy can be realized.

In addition, the controller C includes:

the pressure build-up timer 57 adapted to implement counting up normally except when the count value is cleared to "0" when the hydraulic pressure control unit 5 is controlled to shift from the pressure build-up mode to the pressure reducing mode or to the pressure holding mode and the pressure reducing timer 58 adapted to implement counting up normally except when the count value is cleared to "0" when the hydraulic pressure control unit 5 is controlled to shift from the pressure reducing mode to the pressure build-up mode or to the pressure holding mode.

The controlled variable of the regulator valve 7, the inlet valves 9, 10 or the outlet valves 14, 15 in the hydraulic control unit 5 are made to increase as the high select value TM_MD-CAL which results by high selecting the count values of the pressure build-up timer 57 and the pressure reducing timer 58 by the high select module 59 increases, the generation of control hunting can be prevented.

Additionally, although the controller C controls the electric motor 17 so that the actual motor rotational speed detected by the motor rotational speed detecting module 29 becomes the target rotational speed operated in the target rotational speed operating module 37, when the rotational speed deviation (the target rotational speed–the actual rotational speed) is large, the F/B gain which controls the regulator valve 7 changes in such a manner as to become smaller than when the rotational speed deviation is small, whereby the F/B gain or controlled variable of the regulator valve 7 is made to become small in unnecessary portions so that the generation of overshoot can be suppressed even when the discharge amount of the pump 18 reaches the predetermined value at the initial stage of the control, whereas when the rotational speed deviation (the target rotational speed–the actual rotational speed) is small, the F/B gain is made to become large to increase the controlled variable of the regulator valve 7, whereby the response and toughness with respect to disturbance can be enhanced.

Furthermore, since a series circuit made up of the battery 60 and the switch 61 and a switch 62 for short-circuiting between both the terminals of the electric motor 17 are connected to both terminals of the electric motor 17 in parallel, and since the controller C causes the switch 62 to be closed to make the connection in the circuit so as to short-circuit between both the terminals of the electric motor 17 when the target motor voltage is the certain value of less even in such a state that the electric motor 17 is being driven and the actual rotational speed of the electric motor 17 exceeds the target rotational speed beyond the predetermined value, the deceleration response of the electric motor 17 can be increased with the simple drive circuit.

Thus, while the embodiment of the invention has been described heretofore, it should be understood that the invention is not limited thereto but can be modified variously with respect to the design thereof without departing from the spirit and scope of the invention which are described in the claims thereof.

What is claimed is:

1. A vehicle brake hydraulic pressure control system comprising:
   a hydraulic pressure generating source which outputs hydraulic pressure in response to operation of a brake pedal;
   wheel brakes which operate by application of hydraulic pressure;
   a pump driven by an electric motor;
   a motor rotational speed detecting unit which detects a rotational speed of the electric motor;
   a target rotational speed setting unit which sets a target rotational speed for the electric motor;
   a main hydraulic pressure path which communicates the hydraulic pressure generating source with the pump;
   a sub hydraulic pressure path which communicates the main hydraulic pressure path with the wheel brakes;
   a normally open solenoid valve interposed between the sub hydraulic pressure path and the hydraulic pressure generating source;
   a brake hydraulic pressure detecting unit which detects hydraulic pressures at the wheel brakes;
   a target wheel brake pressure setting unit which sets target hydraulic pressures for the wheel brakes; and
   a controller which controls the electric motor so that the rotational speed detected by the motor rotational speed detecting unit becomes the target rotational speed and also controls the normally open solenoid valve so that the hydraulic pressures in the wheel brakes become the target wheel brake hydraulic pressure,
   wherein the controller decreases a control amount of the normally open solenoid valve as a deviation between the detected rotational speed and the target rotational speed increases.

2. The vehicle brake hydraulic pressure control system as set forth in claim 1, further comprising:
   a switching valve unit comprising:
      inlet valves disposed between the sub hydraulic pressure path and the wheel brakes; and
      outlet valves disposed between the wheel brakes and a reservoir,
   wherein the switching valve unit switches following modes:
      a pressure build-up mode where the inlet valves are opened and the outlet valves are closed;
      a pressure reducing mode where the inlet valves are closed and the outlet valves are opened, and
      a pressure holding mode where the inlet and outlet valves are closed.

3. The vehicle brake hydraulic pressure control system as set forth in claim 2, wherein
   the controller further comprises:
      a pressure build-up timer which implements a count value up normally except when the count value is cleared to "0" when the controller controls to shift from the pressure build-up mode to the pressure reducing mode or to the pressure holding mode;
      a pressure reducing timer which implements the count value up normally except when the count value is cleared to "0" when the controller controls to shift from the pressure reducing mode to the pressure build-up mode or to the pressure holding mode; and
      a high select unit which selects a high select value from the count values of the pressure build-up timer and the pressure reducing timer, and
   wherein the controller increases a control variable of the normally open solenoid valve, the inlet valves or the outlet valves as the high select value increases.

4. The vehicle brake hydraulic pressure control system as set forth in claim 1, wherein the controller further comprises:

a target fluid amount calculating unit which calculates target fluid amount based on the target hydraulic pressure set by the wheel brake hydraulic pressure setting unit;

an actual fluid amount calculating unit which calculates an actual fluid amount based on the hydraulic pressure detected by the brake hydraulic pressure detecting unit; and a target flow rate calculating section which calculates a target flow rate for the wheel brakes based the target fluid amount and the actual fluid amount.

5. The vehicle brake hydraulic pressure control system as set forth in claim 4, wherein the controller switches the pressure build-up mode, the pressure reducing mode and the pressure holding mode based on signs and absolute values of the target flow rates calculated in the target flow rate calculating unit.

6. The vehicle brake hydraulic pressure control system as set forth in claim 1, wherein the controller controls currents applied to the normally open solenoid valve, the inlet valves and the outlet valves based on the target flow rate and a difference between the hydraulic pressures detected by the brake hydraulic pressure detecting unit and the target hydraulic pressures.

7. The vehicle brake hydraulic pressure control system as set forth in claim 1, wherein the controller further comprises a target discharge amount calculating unit which calculates a target discharge amount for the pump based on the target flow rate, and the target rotational speed setting unit sets the target rotational speed based on the target discharge amount.

8. The vehicle brake hydraulic pressure control system as set forth in claim 1, wherein the controller changes a gain which controls the normally open solenoid valve so as to decrease a control amount of the normally open solenoid valve as the deviation between the detected rotational speed and the target rotational speed increases.

9. The vehicle brake hydraulic pressure control system as set forth in claim 1, wherein a series circuit comprising a battery and a switch and a switch for short-circuiting between both terminals of the electric motor are connected to the both terminals of the electric motor in parallel.

* * * * *